Patented Dec. 21, 1926.

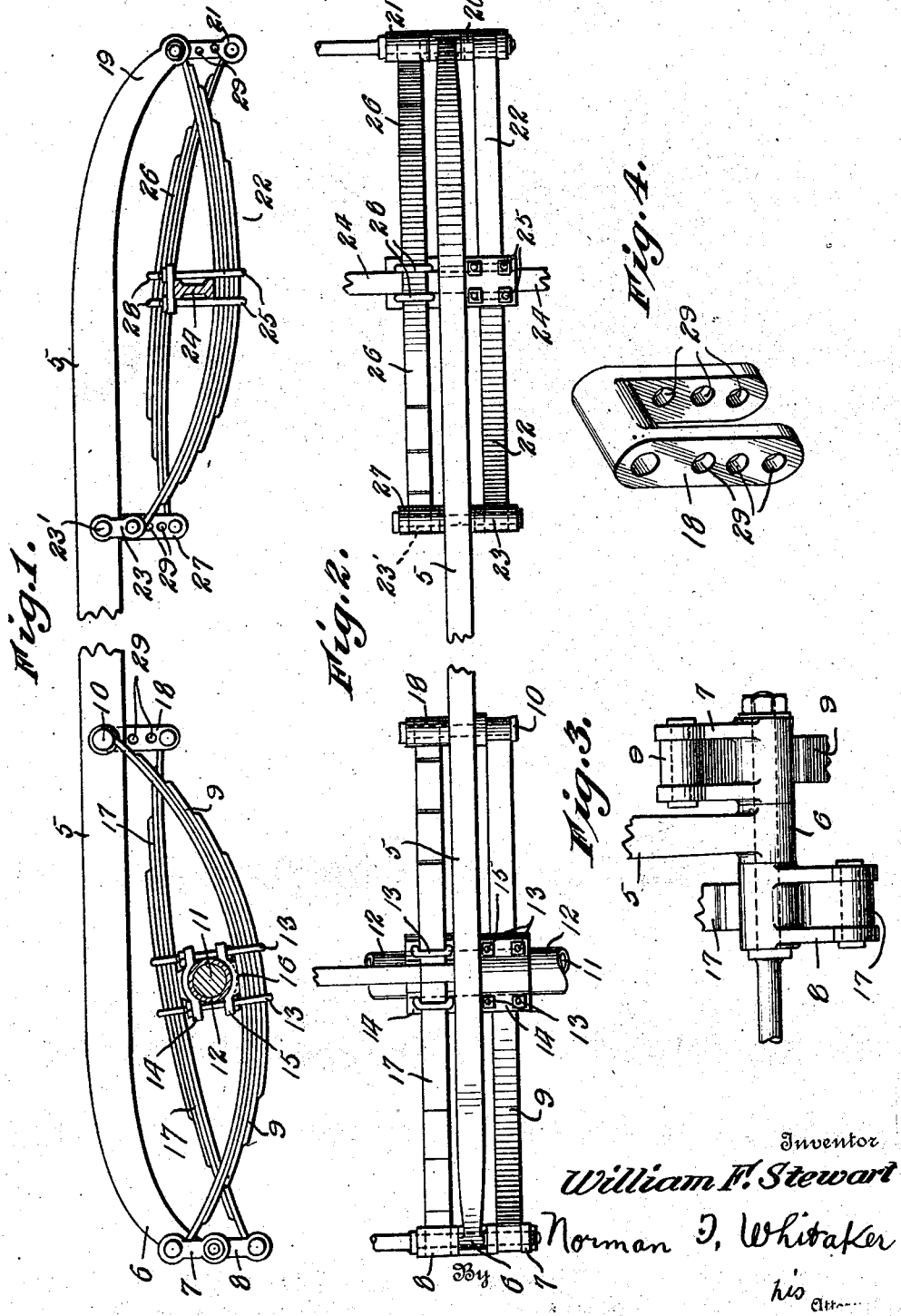

1,611,322

UNITED STATES PATENT OFFICE.

WILLIAM F. STEWART, OF QUINCY, ILLINOIS.

VEHICLE SPRING.

Application filed November 12, 1924. Serial No. 749,452.

My invention relates to vehicle springs and has for its principal object to provide a supporting spring which is adapted to support the body of the vehicle and an auxiliary spring in co-operation with the supporting spring which is adapted to absorb and neutralize the rebound of the supporting spring.

A further object of my invention is to provide such a combination of co-acting springs as to reduce the possibility of breaking the leaves of said springs.

A still further object of my invention is to provide a combination of co-acting vehicle springs that will reduce the vibration of a vehicle to a minimum.

Other objects and advantages of my invention will be apparent during the course of the following description.

In the drawings, which form a part of this specification and in which only a preferred embodiment of my invention is shown:

Figure 1 is a fragmental side elevation of an automobile chassis frame showing my springs attached thereto;

Fig. 2 is a plan view thereof;

Fig. 3 is a rear end view; and

Fig. 4 is a perspective view of one of the adjustable shackles.

Referring in detail to the drawings, in which like characters of reference are employed to designate like parts throughout the same, the numeral 5 designates one of the longitudinal channel iron frame members of an automobile chassis. Pivotally attached to the depending rear end 6 of the frame member 5 on both sides of said frame member 5, are shackles 7 and 8 and in a manner clearly illustrated in Fig. 3 of the drawings. Fastened to the outside shackle 7 is one end of a leaf spring 9, the opposite end of which is fastened to a stud 10 attached to the frame member 5 and which passes therethrough, as shown in Figs. 1 and 2. The spring 9 passes under the rear axle 11 of the automobile which rear axle revolves in the usual manner in a sleeve 12. The spring 9 is attached to the rear axle by means of a pair of U-bolts 13, which are passed through the springs and upward through a pair of oppositely disposed clamping blocks 14 and 15, the lower clamping block 15 being provided with a flattened surface 16 upon which the face of the spring 9 bears. Upon this spring 9 rests the weight of the body of the vehicle.

To the inner shackle 8 is attached one end of an auxiliary leaf spring 17 the opposite end of which is adjustably attached to a depending shackle 18 which is pivotally mounted on the free end of the stud 10 on the inner side of the frame member 5. This spring 17 passes over the rear axle and is attached thereto in a manner similar to the spring 9, as above described. The spring 17 has a tension of about two-thirds that of the supporting spring 9 and is adapted to absorb or neutralize the rebound of the supporting spring 9 when the wheels of the vehicle pass over an obstruction.

To the front end 19 of the frame member 5 is pivotally mounted a shackle 21 in a manner similar to the shackle 8 heretofore described. One end of a supporting spring 22 is attached to the end of the front end 19 of the frame 5, the opposite end being fastened to a depending shackle 23 pivotally mounted adjacent the outer surface of the frame member on one end of a bolt 23' which passes laterally through the frame member 5. This supporting spring passes under the front axle 24 of the automobile and is attached thereto by means of U-bolts 24, as shown in Figs. 1 and 2.

To the inner shackle 21 is attached one end of an auxiliary spring 26 similar in construction and function to the spring 17. The opposite end of the spring 26 is attached to a depending shackle 27 pivotally mounted on the free end of the bolt 25 adjacent the inner face of the frame member 5. This spring 26 passes over the front axle 24 and is attached thereto by means of bolts 28.

The shackles 18, 21 and 27 are provided with a plurality of longitudinally aligned apertures 29 whereby adjustment of the tension of the springs 17 and 26 may be made. It is understood that the construction of m device is similar on both sides of the vehicle.

It is further understood that only a preferred embodiment of my invention is herein shown and described and that any departure such as in shape, size or arrangement of parts may be resorted to without departing from the spirit of my invention or from the spirit or scope of the subjoined claim.

Having thus described my invention what I claim is:

In combination with a vehicle comprising a chassis frame and axles, of shackles pivotally attached to the frame adjacent its outer edge, shackles pivotally attached to the frame adjacent its inner edge, supporting springs fastened to the axles and said first mentioned shackles and counteracting springs attached to the axles and the second mentioned shackles, said second mentioned shackles provided with a plurality of apertures whereby the tension of the counteracting spring may be regulated, each of the springs having laminated leaves, the longest leaf of each spring being nearest the axle.

WILLIAM F. STEWART.